United States Patent
Deolalikar et al.

(10) Patent No.: US 8,250,302 B2
(45) Date of Patent: Aug. 21, 2012

(54) CACHE MANAGEMENT USING SAMPLED VALUES ASSIGNED TO A REQUEST

(75) Inventors: Vinay Deolalikar, Cupertino, CA (US); Kave Eshghi, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 929 days.

(21) Appl. No.: 12/243,093

(22) Filed: Oct. 1, 2008

(65) Prior Publication Data

US 2010/0082907 A1 Apr. 1, 2010

Related U.S. Application Data

(60) Provisional application No. 61/063,021, filed on Jan. 31, 2008.

(51) Int. Cl.
*G06F 12/08* (2006.01)
*G06F 12/12* (2006.01)

(52) U.S. Cl. ........................................ 711/118; 711/133
(58) Field of Classification Search .................. 711/133, 711/159, 118
See application file for complete search history.

(56) References Cited

U.S. PATENT DOCUMENTS

| | | | | |
|---|---|---|---|---|
| 5,568,632 A | * | 10/1996 | Nelson | 711/133 |
| 5,974,507 A | * | 10/1999 | Arimilli et al. | 711/133 |
| 6,332,178 B1 | * | 12/2001 | Dean et al. | 711/118 |
| 6,807,607 B1 | * | 10/2004 | Lamparter | 711/133 |
| 6,996,678 B1 | * | 2/2006 | Sharma | 711/133 |
| 7,103,735 B2 | * | 9/2006 | Iyer | 711/158 |
| 2005/0188158 A1 | * | 8/2005 | Schubert | 711/133 |
| 2009/0172315 A1 | * | 7/2009 | Iyer et al. | 711/158 |

OTHER PUBLICATIONS ip.com Prior Art Database, "A Method for Cache Management in Storage Systems," Feb. 18, 2004, pp. 1-4.*

* cited by examiner

Primary Examiner — Sanjiv Shah
Assistant Examiner — Glenn Gossage

(57) ABSTRACT

A system and method for data cache management are provided in which a request for access to data is, and a sample value is assigned to the request, the sample value being randomly selected according to a probability distribution. The sample value is compared to another value such as a previously stored sample value, and the data is selectively stored in the cache based on results of the comparison. If the requested data is not in the cache, the sample value may be compared with an extreme one of a plurality of sampled values such as the lowest sampled value. Each of the sampled values may be stored in a database, and the sampled values or the probability distribution may be changed over time to account for frequency of requests.

15 Claims, 2 Drawing Sheets

CACHE MANAGEMENT USING SAMPLED VALUES ASSIGNED TO A REQUEST

This Application claims the benefit of U.S. Provisional Application Ser. No. 61/063021, filed 2008-Jan.-31, titled "System for and Method of Data Cache Management".

FIELD OF THE INVENTION

The present invention relates to the field of computer systems. More particularly, the present invention relates to caching of data in computer systems.

BACKGROUND OF THE INVENTION

Caching of data is used in computer systems for reducing the time required to access the data. A data cache is a data repository which typically has a faster access time, but smaller capacity, than other repositories for the data. Therefore, when data in the cache data is accessed, it can be accessed more quickly than if the data were stored elsewhere. Otherwise, if the data is not in the cache, the data must be retrieved from another data repository, which typically takes longer.

During operation of a computing system that employs a data cache, when a request for data is received, if the data is located in the cache, this is referred to as a "cache hit." On the other hand, if the requested data is not located in the cache, this is referred to as a "cache miss." For data cache management, it is desired to maximize the cache hit rate.

There exists a spectrum of schemes for populating and maintaining caches. These schemes generally he somewhere on a spectrum at one end of which is LRU (Least Recently Used) and other end of which is LFU (Least Frequently Used). LRU schemes emphasize recency; data items that have not been accessed recently are replaced in the cache with those that have been accessed recently. This is done with the expectation that an item that was accessed recently will be accessed again in the near future.

At the other end of the spectrum is LFU, which emphasizes frequency. LFU schemes cause data items which are accessed frequently to replace those items in the cache which have not been accessed frequently. This is done with the expectation that an item that was accessed frequently will be accessed again in the near future.

Other algorithms, such ARC (Adaptive Replacement Cache) and LRFU (Least Recently Frequently Used), attempt to capture benefits of both LRU and LFU policies.

While some cache management schemes are known, there is still room for improvement of such schemes. The present invention is directed to an improved technique for caching of data.

The present invention provides a system for and a method of data cache management. In accordance with an embodiment of the present invention, a method of cache management is provided. A request for access to data is received. A sample value is assigned to the request, the sample value being randomly selected according to a probability distribution. The sample value is compared to another value. The data is selectively stored in the cache based on results of the comparison.

BRIEF DESCRIPTION OF THE DRAWINGS

The present invention is described with respect to particular exemplary embodiments thereof and reference is accordingly made to the drawings in which.

DETAILED DESCRIPTION OF THE INVENTION

The present invention uses order statistics for data cache management. This means that in accordance with an embodiment of the present invention, statistical methods are employed for data cache management in which the ordering (or relative magnitude) of sample values is used to decide whether a particular data element is to replace another data element in a cache in an effort to maximize the cache hit rate.

Assume that a variable can take on any value within a range (e.g. from zero to one) and that a random sample of the variable is equally likely to take on any value within the range. This is referred to as a uniform probability distribution. In this case, when a number n samples are obtained and arranged in order of increasing magnitude, the magnitude of the highest sample tends to increase (i.e. it gets closer to the upper end of the range) as the number n increases. Similarly, the magnitude of the lowest sample tends to decrease (i.e., it gets closer to the lower end of the range) as the number n increases.

In accordance with an embodiment of the present invention, each time a request for access to a data element is received, a sample value is randomly selected according to a probability distribution and assigned to that request. Also, for each data element in cache, the highest sample value is retained from among sample values obtained from requests for that data element. As the number of requests for access to a particular data element increases, the number of sample values also increases. This means that the magnitude of a highest one of the samples for that data element also tends to increase. Therefore, for data elements in the cache, those that are requested frequently will tend to be associated with a higher maximum sample value than data elements that are seldom requested.

In this embodiment, when a request for a data element not located in the cache is received, a sample value is also obtained for that request. This new sample value is compared to the sample values for data elements already in the cache. If the new sample value is higher than a lowest of the sample values for data elements already in the cache, then the newly-requested data element is inserted into the cache. Otherwise, if the new sample value is lower than the lowest of the sample values for data elements in the cache, then the newly-requested data element is not inserted into the cache. To avoid exceeding the capacity of the cache by the insertion of the newly-requested data element, a data element already in the cache is selected for removal. The data element to be removed is preferably one with the lowest associated sample value.

Figures 1, 2, 3:
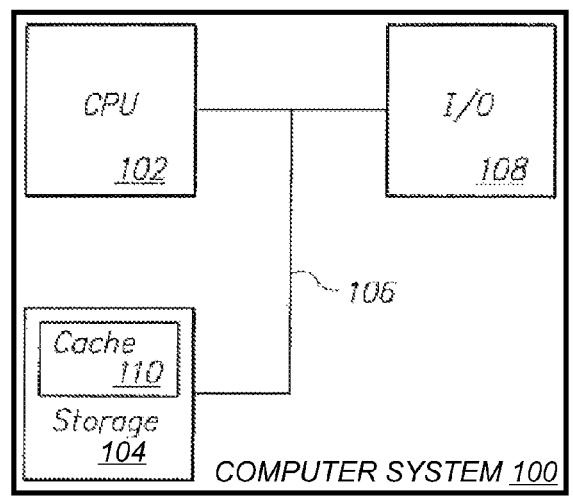
FIG. 1 illustrates a block schematic diagram of a general-purpose computer system by which the present invention may be implemented.
FIG. 2 illustrates a data cache in which cached data is stored in accordance with an embodiment of the present invention.
FIG. 3 illustrates a database in which sampled values for requested data elements are stored in association with identifications of the data elements in accordance with an embodiment of the present invention.

FIG. 1 illustrates a block schematic diagram of a general-purpose computer system 100 by which the present invention may be implemented. The computer system 100 may include a general-purpose processor, or central-processing unit (CPU) 102, storage 104, a communication bus 106, and input/output devices 108, such as a keyboard, monitor and mouse. The storage 104 may include persistent storage for software programs and data (e.g., a hard disk or removable media such as a floppy disk or optical disk) and transitory memory (e.g., random-access memory (RAM), synchronous dynamic random-access memory (SDRAM) or flash memory) and may also include a data cache 110. The computer system 100 is, itself, conventional. As such, it is apparent that the system 100 may include more or fewer elements than shown in FIG. 1 and that other elements may be substituted for those illustrated in FIG. 1. Software for implementing the present invention may be stored in the storage 104, such as on a computer-readable medium, which when executed, causes the computer system 100 to perform steps described herein.

FIG. 2 illustrates a data cache 200 in accordance with an embodiment of the present invention. As shown in FIG. 2, the data cache 200 includes a number m of entries or cache lines, each of which may store a data element, such as a data block or a page of data. The cache 200 may comprise a processor or CPU cache (e.g., the cache 110 shown in FIG. 1) which is used by the processor or CPU 102 for reducing data access times to data in a main memory included in the storage 104. It is apparent, however, that the present invention can be used in connection with other types of cache. For example, the cache 200 may comprise a disk cache which is used for reducing data access times to data stored on a hard disk. As another example, the cache 200 may comprise a server cache which is used for reducing data access times to data stored at a server (e.g. a network proxy cache). In general, the present invention can be applied to any multi-level or hierarchical data storage in which decisions are made as to at which level a data element is to be placed.

FIG. 3 illustrates a database 300 in which sample values for requested data elements are stored in association with identifications of the data elements in accordance with an embodiment of the present invention. As shown in FIG. 3, the database 300 can be arranged in the form of a table having two columns, a first column 302 for storing identifications of data elements in the cache 200 and a second column 304 for storing sampled values for each of the data elements in the cache 200.

The identifications of the data elements in the database 300 may, for example, each comprise pointer to a location of the corresponding data element. For ease of explanation, these identifications are shown in FIG. 3 as letters (A, B, C, D, . . . , etc.). In addition, the data elements which correspond to these identifications are labeled in FIG. 2 as Data_A, Data_B, Data_C, Data_D, . . . , etc.). As is also shown in FIGS. 2 and 3, the number of rows contained in the database 300 can be the same number m as there are lines in the cache 200. The sample values shown in the second column 304 of the database 300 range from zero to one. However, a different range of values can be selected.

Figure 4:
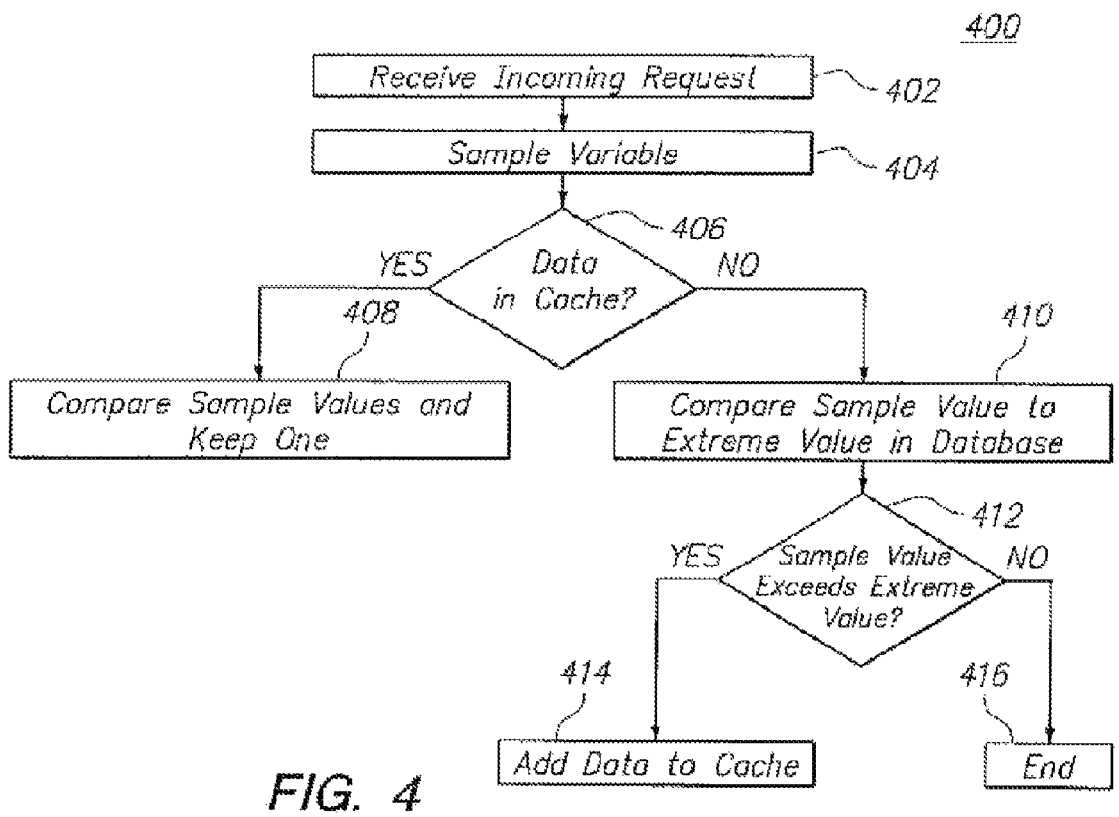
FIG. 4 illustrates a control flow diagram for a method of data cache management in accordance with an embodiment of the present invention.

FIG. 4 illustrates a control flow diagram 400 for a method of data cache management in accordance with an embodiment of the present invention. The method may be performed each time a request is made for access to a data element. For example, the accesses can include read accesses, write accesses or both read and write accesses. As explained more fully below, the requested data elements may or may not be in the cache 200. In a step 402, an incoming request for access to data is received. For example, in the case of processor cache, the incoming request may originate from the processor or CPU 102 of FIG. 1. As another example, in the case of a server cache, the incoming request may originate from a web browser connected to the Internet which is requesting a particular web page from a web server. In this case, the requested data element is the web page.

In a step 404, a variable is sampled to obtain a new sample value of the variable. For example, a uniform probability distribution which ranges from zero to one may be randomly sampled such that any value within the range is equally likely to occur. This sampled value is assigned to the request that was received in step 402. A random number generator, such as a computer-implemented computational random number generator, can be used to generate the sample value in step 404.

In a step 406, a determination is made as to whether the data requested in step 402 is located in the cache 200. If the data is already in the cache 200, this indicates that the database 300 will already contain a sample value for the data element from an earlier request for the data element. In a step 408, the new sample value obtained in step 404 for the request is compared to the old sample value already stored in the database 300 for the requested data element. Based on this comparison, one of the new sample value and the old sample value is selected to be stored in the database 300. For example, the database 300 shown in FIG. 3 includes an entry for data element A, which has a corresponding sample value of 0.7. If the new sample value for a request to access data element A is higher than 0.7 (e.g. the new sample value is 0.87), then the database 300 is altered such that the new sample value of 0.87 is stored in place of the old sample value of 0.7 for data element A. Conversely, if the new sample value is lower than 0.7 (e.g. the new sample value is 0.5), then no change is made to the database 300. In addition, if the requested data element (which in this example is Data_A) is located in the cache 200, then this is a cache hit and the data element is accessed from the cache 200.

If, in step 406, it is determined that the requested data element is not currently in the cache 200, then in a step 410, the new sample value obtained in step 404 for the request is compared to an extreme one of a plurality of the samples in the database 300. The plurality of sample values correspond to different data elements which are already located in the cache. Because this is a cache miss, the requested data element is itself accessed at its current location. Results of the comparison in step 410 are used to determine whether the requested data element will be inserted into the cache 200. For example, the extreme one of the plurality of samples may be the lowest one of the samples in the database 300. If the new sample value is higher than the lowest one of the samples (extreme value), then the requested data is inserted into the cache 200 in a step 414. In addition, the new sample value is inserted into the database 300. Conversely, if the new sample value is lower than the lowest one of the samples (extreme value), then the requested data is not inserted into the cache 200 and the method ends (step 416). In a particular example, suppose the sample value obtained for the requested data element is 0.52 and the values of samples already in the database 300 range from 0.27 to 0.7. Because 0.52 is greater than 0.27, the requested data is inserted into the cache 200 in step 414. Conversely, suppose that the requested data element has a sample value of 0.14 and, as before, the values of samples already in the database 300 range from 0.27 to 0.7. Because 0.14 is not greater than 0.27, the requested data is not inserted into the cache 200.

When the cache 200 is full and a new data element is to be added to the cache 200, a data element already in the cache 200 is selected for removal. This is done to avoid exceeding the capacity of the cache 200. The data element to be removed is preferably the one with the lowest associated sample value.

When the cache 200 is not yet full, each cache miss may result in the insertion of the requested data element into the cache 200 and the insertion of a corresponding sample value into the database 300. Referring to FIG. 4, for each cache miss that occurs when the cache 200 is not yet full, step 414 may be performed and steps 410 and 412 may be skipped.

In accordance with the method of FIG. 4, each time a particular data element is requested, it gets a new sample value winch is, in effect, a "chance" for a high sample value. Each data element gets only as many chances as its request frequency. The more chances it gets, the higher its sample value is likely to be and thus the higher the likelihood is of its being inserted into the cache. Therefore, more-frequently requested data elements are more likely to be inserted into the cache, and to remain in the cache, than less-frequently requested data elements. However, there is no need to track and retain the number of times a particular data element has been requested.

As explained above, as a result of the comparison in step 408, the higher one of the sample values is retained in the database 300. Also, in the comparison in step 410, the new sample value is compared to a lowest one of the samples already in the database 300. This is based on the fact that as more samples are obtained, the value of the highest one of the samples tends to increase. This means that each time a new request of a particular data element is received, the likelihood increases that it will be inserted into the cache 200 if it is not already in the cache 200., and the likelihood increases that it will remain in the cache 200 if it is already in the cache 200. This same effect can be achieved based on the fact that as more samples are obtained, the value of the lowest one of the samples tends to decrease. Thus, in an alternative embodiment, as a result of the comparison in step 408, the lower one of the sample values can be retained in the database 300. Also, in the comparison in step 410, the new sample value can be compared to a highest one of the samples already in the database 300 and, if the new sample value is lower than the highest one of the samples, then the newly requested data can be inserted into the cache 200. This is based on the fact that as more samples are obtained, the value of the lowest one of the samples tends to decrease.

Because the sample values are essentially random, it is possible for a data element that is requested infrequently to have a relatively high (or low) sample value. For example, the sample value obtained the first time that a particular data element is accessed might be 0.99. In this case, the sample value does not accurately reflect the number of times the data element is accessed. However, such an occurrence may result in the eviction of another data element from the cache 200 that had been accessed a greater number of times. To minimize the effect of such occurrences, the identity of data elements recently evicted from the cache 200 may be retained (e.g. by storing their identities in the storage 104) for a period of time and used to increase the likelihood of returning those data elements to the cache 200 when they are requested again. More particularly, if a current request is to access a data element that had been evicted from the cache 200 within a specified time period prior to receiving the current request, the new sample value obtained for the request may be altered to increase the likelihood that the data element will be re-inserted into the cache 200. For example, the new sample value obtained in step 404 may be multiplied by a predetermined factor or multiple samples might be obtained and the highest retained. Then, this altered sample may be used for comparison to determine whether the data element is to be inserted into the cache 200 (e.g. in step 410).

In addition, when a data element that is requested infrequently receives a relatively high sample value, this can result in that data element remaining in the cache 200 while other data elements that are requested more frequently are not inserted into the cache 200 (since their sample values are repeatedly lower). To minimize the effect of this, the recency of requests may be employed to increase the likelihood that a data element that was not recently accessed will be evicted from the cache 200 and replaced by a data element that was accessed more recently.

In one such embodiment, the sample distribution or range may be changed over time, such as at periodic time intervals. For example, the probability distribution of the samples may initially range between zero and one. The probability distribution may then be gradually expanded such that at a later time, it ranges between zero and 1.1. Then, for a next interval, the probability distribution may be expanded to range between zero and 1.2, and so on. In this way, sample values for newly-received requests will, on average, tend to be higher than those for prior requests and will thus be more likely to result in the corresponding data elements being retained in the cache 200.

Alternatively, rather than changing the sample distribution or variance based on elapsed time, the sample distribution or variance may be changed over time based on the number of requests received. For example, the probability distribution of the samples may initially range between zero and one. Each time a request for access to data is received, a counter may be incremented and, when the counter reaches a predetermined count, the probability distribution may be increased such that it ranges between zero and 1.1. Then, when the counter reaches a predetermined count again, it may be increased to range between zero and 1.2, and so on. This will also have the effect that sample values for newly-received requests will, on average, tend to be higher and thus more likely to result in the corresponding data elements being retained in the cache 200.

Further, rather than incrementing the counter for every request, the counter may be incremented only for cache hits and not for cache misses.

In another such embodiment, the sample values in the database 300 may be gradually reduced over time. For example, at periodic time intervals, the sample values in the database may be reduced by subtracting a predetermined amount from them (e.g. 0.1 where the sample range is from zero to one) or by reducing them by a predetermined percentage of their current value (e.g. by subtracting 10% from their current, values). This process may be repeated such that the sample values are repeatedly reduced over time.

Further, rather than changing the sample values based on elapsed time, they may be changed over time based upon a number of requests received or based upon a number of cache hits. For example, a counter may be incremented for each cache hit and when the counter reaches a predetermined count, the sample values may be reduced. As before, the sample values may be repeatedly reduced each time the counter reaches a predetermined count.

Figure 5:
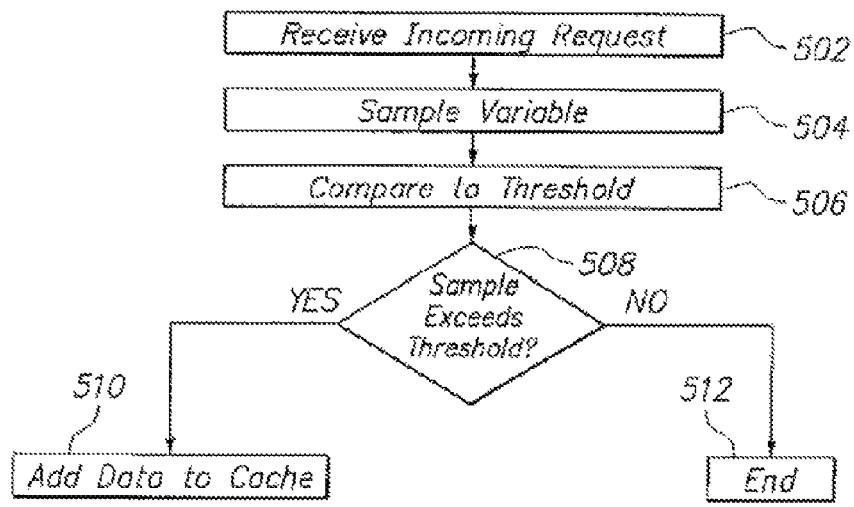
FIG. 5 illustrates a control flow diagram for an alternative method of data cache management in accordance with an embodiment of the present invention.

FIG. 5 illustrates a control flow diagram 500 for a method of data cache management in accordance with an alternative embodiment of the present invention. The method may be performed each time a request is made for access to a data element.

In a step 502, an incoming request for access to data is received. In a step 504, a variable is sampled to obtain a new sample value of the variable. For example, a uniform distribution between zero and one may be randomly sampled such that any value within the range is equally likely to occur. This sampled value is assigned to the request that was received in step 502. As before, a random number generator, such as a computer-implemented computational random number generator, can be used to generate the sample value in step 504.

In a step 506, the new sample value obtained in step 504 for the request is compared to a preselected threshold as determined in step 508 to determine whether the requested data element will be inserted into the cache 200. If the new sample value exceeds the threshold, then the requested data element may be inserted into the cache 200 in step 510. In an embodiment, the cache 200 may be arranged as a queue with the newly requested data element placed at the head of the queue irrespective of whether or not the data element was already in the cache 200. More particularly, if the data element was already in the cache 200, then the data element may be removed from its prior location in the queue and moved to the head of the queue. If the data element was not in the cache 200, it may be placed at the head of the queue and, to make room in the cache 200, a data element at the end of the queue may be evicted from the cache 200.

Conversely, if in step 508, it is determined that the new sample value does not exceed the threshold, then the requested data element is accessed at its current location but it is not inserted into the cache 200 and the method ends (step 512).

Similarly to the method of FIG. 4, there is no need to retain information regarding the number of times a particular data element has been requested. Each data element gets only as many "chances" at exceeding the threshold (and thus being added to the cache) as its frequency. The more chances it gets, the higher the likelihood is of its being inserted into the cache. Therefore, more-frequently requested data elements are more likely to be inserted into the cache and to remain in the cache than less-frequently requested data elements.

As with the method of FIG. 4, the method of FIG. 5 may be augmented so that later-arriving requests have a higher likelihood of resulting in the requested data element being inserted into the cache. For example, the probability distribution or variance of the samples may be changed over time, such as at periodic time intervals or based upon a count of requests or cache hits reaching a predetermined count. In this way samples obtained later are, on-average, higher than samples obtained earlier. As such, these later-arriving samples will he more likely to exceed the threshold. Alternatively, to achieve essentially the same effect, the threshold may he reduced over time. For example, the threshold may be reduced based on elapsed time or based upon a number of requests or cache hits.

As explained herein, the probability distribution of the samples may be uniform. However, this is not necessary. For example, other probability distributions, such as an exponential distribution, can be used. The selection of a probability distribution may be performed as a preliminary step prior to execution of the method of FIG. 4 or 5.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of cache management of a cache comprising steps of:
  receiving a request for access to data;
  assigning a sample value to the request;
  determining whether the requested data is in the cache; and,
  if the requested data is in the cache,
    comparing the assigned sample value to a previously-stored sample value for the requested data, the previously-stored sample value having been stored in a database, and
    based on this comparison, storing a selected one of the assigned sample value and the previously-stored sample value in the database;
  otherwise, if the requested data is not in the cache,
    comparing the assigned sample value to an extreme one of a plurality of sampled values previously stored in the database, and
    based on this comparison, selectively inserting the requested data into the cache.

2. The method according to claim 1 further comprising:
  repeating said steps of receiving, assigning, determining, and either comparing and storing or comparing and selectively inserting, for each of a plurality of requests; and
  altering a probability distribution for said step of sampling over time.

3. The method according to claim 1 further comprising:
  repeating said steps of receiving, assigning, determining and either comparing and storing or comparing and selectively inserting, for each of a plurality of requests; and
  altering each of the sampled values stored in the database over time.

4. The method according to claim 1, wherein the assigned sample value is randomly assigned to the request according to a uniform probability distribution having an interval.

5. The method according to claim 4, wherein the interval ranges from zero to one.

6. The method according to claim 1, wherein the selected one of the assigned sample value and the previously-stored sample value is a higher one of the two values.

7. The method according to claim 6, wherein the extreme one of the plurality of sampled values is the lowest one of the plurality of sampled values previously stored in the database and the requested data is inserted into the cache if the sample value is higher than the lowest one of the plurality of sampled values previously stored in the database.

8. A system for cache management comprising:
  a cache that stores data elements;
  a database that stores identifications of each data element stored in the cache, the database storing a sample value of a variable corresponding to each data element stored in the cache; and
  a computing device configured to:
    receive a request for access to a data element,
    sample a variable for the request to obtain a new sample value,
    determine whether the requested data element is in the cache, and
    if the requested data element is in the cache, compare the new sample value to a previously-stored sample value for the requested data element, the previously-stored sample value having been stored in the database, and based on this comparison, store one of the new sample value and the previously-stored sample value in the database,
    otherwise, if the requested data element is not in the cache, compare the new sample value to an extreme one of a plurality of sampled values previously stored in the database, and based on this comparison, selectively insert the requested data element into the cache.

9. The system according to claim 8, wherein the variable has a probability distribution that is altered over time.

10. The method according to claim 8, wherein each of the sampled values stored in the database is altered over time.

11. The system according to claim 8, wherein the variable has a uniform probability distribution over an interval.

12. The system according to claim 11, wherein the interval ranges from zero to one.

13. The system according to claim 8, wherein the stored one of the new sample value and the previously-stored sample value is a higher one of the two values.

14. The system according to claim 13, wherein the extreme one of the plurality of sampled values is the lowest one of the plurality of sampled values previously stored in the database and the requested data element is inserted into the cache if the new sample value is higher than the lowest one of the plurality of sampled values previously stored in the database.

15. A computer product comprising non-transitory computer-readable storage media encoded with code configured to:
receive a request for access to data;
assign a sample value to the request;
determine whether the requested data is in the cache; and,
if the requested data is in the cache,
    compare the assigned sample value to a previously-stored sample value for the requested data, the previously-stored sample value having been stored in a database, and
    based on this comparison, store a selected one of the assigned sample value and the previously-stored sample value in the database;
otherwise, if the requested data is not in the cache,
    compare the assigned sample value to an extreme one of a plurality of sampled values previously stored in the database, and
    based on this comparison, selectively insert the requested data into the cache.

* * * * *

UNITED STATES PATENT AND TRADEMARK OFFICE
CERTIFICATE OF CORRECTION

PATENT NO. : 8,250,302 B2
APPLICATION NO. : 12/243093
DATED : August 21, 2012
INVENTOR(S) : Vinay Deolalikar et al.

Page 1 of 1

It is certified that error appears in the above-identified patent and that said Letters Patent is hereby corrected as shown below:

In the Claims:

In column 9, line 1, in Claim 10, delete "method" and insert -- system --, therefor.

Signed and Sealed this
Twenty-eighth Day of May, 2013

Teresa Stanek Rea
*Acting Director of the United States Patent and Trademark Office*